United States Patent [19]

Hill et al.

[11] 4,443,657
[45] Apr. 17, 1984

[54] RIBBON CABLE WITH A TWO-LAYER INSULATION

[75] Inventors: Ronald A. Hill, Harthausen; Ralf Tillmanns, Schoenau; Bernd Sieberling, Gruenwold, all of Fed. Rep. of Germany

[73] Assignee: W. L. Gore & Associates, Inc., Newark, Del.

[21] Appl. No.: 420,876

[22] Filed: Sep. 21, 1982

Related U.S. Application Data

[63] Continuation-in-part of Ser. No. 266,721, May 26, 1981, abandoned.

[30] Foreign Application Priority Data

May 30, 1980 [DE] Fed. Rep. of Germany ....... 3020622

[51] Int. Cl.³ .............................................. H01B 7/08
[52] U.S. Cl. ................... 174/110 FC; 156/52; 156/55; 174/110 F; 174/117 F; 174/117 FF; 350/96.23
[58] Field of Search ......... 174/110 F, 110 FC, 117 F, 174/117 FF; 156/52, 55; 350/96.3

[56] References Cited

U.S. PATENT DOCUMENTS

| | | | |
|---|---|---|---|
| 3,082,292 | 3/1963 | Gore | 174/117 F |
| 3,833,755 | 9/1974 | Soelberg | 174/117 F |
| 3,902,974 | 4/1974 | Emmel | 174/117 FF X |
| 4,000,348 | 12/1976 | Harlow | 174/110 FC X |
| 4,382,236 | 5/1983 | Suzuki | 174/117 FF X |

FOREIGN PATENT DOCUMENTS

| | | | |
|---|---|---|---|
| 2920031 | 12/1979 | Fed. Rep. of Germany ... | 174/110 F |
| 2036798 | 12/1970 | France | 174/117 F |
| 1390152 | 4/1975 | United Kingdom | 174/117 F |
| 1425928 | 2/1976 | United Kingdom | 350/96.23 |

*Primary Examiner*—R. R. Kucia
*Attorney, Agent, or Firm*—Finnegan, Henderson, Farabow, Garrett & Dunner

[57] ABSTRACT

An improved multiconductor ribbon cable the conductors having at least two layers of polytetrafluoroethylene (PTFE) insulation, a porous unsintered inner layer, that is, the one closest to the conductors, and an impermeable sintered outer layer. Webs of impermeable sintered PTFE connect the insulated conductors. The process for manufacturing the cable includes embedding the conductors between inner sheets of expanded unsintered PTFE and outer sheets of extruded unsintered PTFE, then compressing the sheets only in the web region to high density, and sintering the webs plus the outer insulation layer.

12 Claims, 5 Drawing Figures

RIBBON CABLE WITH A TWO-LAYER INSULATION

BACKGROUND OF THE INVENTION

This application is a continuation-in-part of Application Ser. No. 266,721 filed on May 26, 1981 now abandoned.

1. Field of the Invention

The present invention relates to cables for the transmission of electromagnetic energy and, more particularly, to multiconductor flat or ribbon cables having a two-layer insulation.

2. Description of the Prior Art

Insulated flat or ribbon cables for the transmission of electromagnetic energy are known in the art. For example, U.S. Pat. No. 3,082,292 discloses a cable which comprises a plurality of conductors coated with polytetrafluoroethylene (PTFE). That cable, as well as other conventional flat or ribbon cables, are manufactured using extruded unsintered PTFE tape which is later heated to a temperature above the crystalline meltpoint of the tape, thereby causing the insulation to sinter or coalesce into an essentially impermeable structure.

Although conventional multiconductor flat or ribbon cables having a one layer sintered PTFE insulation are suitable for many purposes, such cables present difficulties in some specific applications. Particularly where a high flexibility of the cable is necessary and where insulation displacement connectors (IDC's) are used.

Conventional multiconductor flat or ribbon cables, insulated with a layer of sintered or coalesced PTFE or with other materials such as polyvinyl chloride (PVC) or combinations of PVC with an outer layer of polyethylene (PE), are relatively hard and stiff. They lack the necessary flexibility required in some applications. This characteristic limits the usefulness of such conventional cables in areas where high flexibility is essential.

Moreover, difficulties are often encountered when connecting conventional multiconductor flat or ribbon cables to IDC's. These difficulties are caused by the failure of the distance between individual conductors to be maintained with the necessary precision, so that the contact prongs of an IDC either do not contact with the conductors or cut into individual strands of the conductors. In conventional multiconductor flat or ribbon cable having an insulation of PVC or combinations of PVC and PE, the distance between conductors is not maintainable to required tolerances for application of IDC's because dimensions of PVC and PE change during storage due to cable weight, humidity and temperature.

SUMMARY OF THE INVENTION

Accordingly, it is an object of the present invention to reduce the problems of insufficient flexibility and difficulty of connecting flat or ribbon cables to insulation displacement connectors.

Another object of this invention is to achieve an economical lightweight multiconductor ribbon cable having a reduced risk of breakage between conductor and insulation.

Still another object of this invention is to achieve a multiconductor ribbon cable having good electrical and thermal properties.

Yet another object of this invention is to achieve a multiconductor ribbon cable having a convenient manufacturing process.

Additional objects and advantages of the invention are set forth in part in the description which follows, and in part are obvious from the description or may be learned by practice of the invention. The objects and advantages of the invention may be realized and obtained by means of the articles, apparatus and methods particularly pointed out in the appended claims.

The objectives of this invention are accomplished by a cable construction having an inner insulation layer of a relatively soft polytetrafluoroethylene (PTFE) material directly around the conductor and an outer insulation layer of a relatively hard PTFE material. The hard outer PTFE insulation layer maintains the overall dimensions of the ribbon cable and is impermeable while the soft, porous, inner PTFE insulation layer allows dimensional accommodation of conductors to the prongs of an IDC.

In accordance with the purposes of the invention as broadly described herein, the multiconductor ribbon cable of the present invention for transmitting electromagnetic signals comprises a plurality of conductors spaced apart in a planar relationship; a plurality of inner layers each surrounding one of the conductors, the inner layers being formed of porous, substantially unsintered polytetrafluoroethylene; a plurality of outer layers each substantially surrounding one of the inner layers, the outer layer being formed of impermeable sintered polytetrafluoroethylene; and a plurality of webs each connecting an outer layer to an adjacent outer layer, each of the webs being formed of impermeable, sintered polytetrafluoroethylene.

Preferably, the porous unsintered polytetrafluoroethylene is expanded extruded PTFE having a volume percent of air of greater than about 50%.

Further in accordance with the purposes of the present invention as broadly described herein, the method for manufacturing a multiconductor ribbon cable for transmitting electromagnetic signals comprises the steps of embedding a plurality of spaced apart conductors in top and bottom inner films of porous unsintered polytetrafluoroethylene and in top and bottom outer films of unsintered extruded polytetrafluoroethylene; compressing under pressure the inner and outer films located between the conductors to form flat web regions between adjacent conductors; and sintering the outer films and the entire web regions.

Preferably, the compressing step is carried out at room temperature and at a pressure to densify the films in the web region to at least a condition of translucence.

This invention will be further understood by reference to the drawings, all of which are given for illustrative purposes only and are not limitative.

DESCRIPTION OF THE PREFERRED EMBODIMENT

Figure 4:
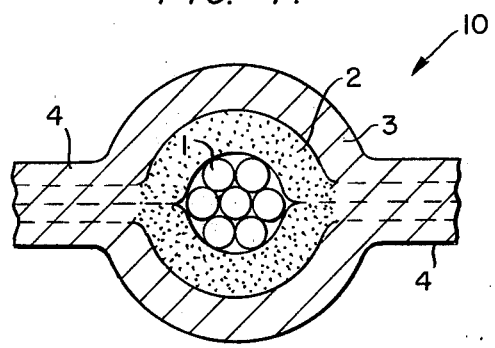
FIG. 4 is a magnified view of section "A" after completion of the process used to assemble the cable using the components in FIG. 1.
Figure 5:
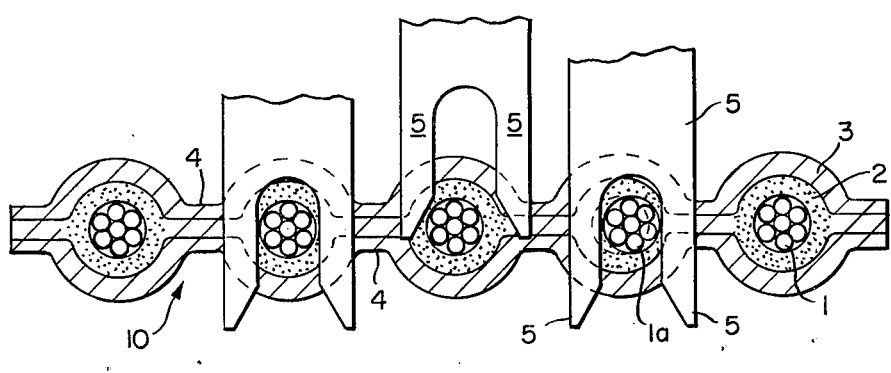
FIG. 5 is a diagrammatical view of the assembled cable depicting the self-alignment feature.

With reference to FIGS. 4 and 5 of the drawings, there is shown generally a portion of a flat, multiconductor or "ribbon" cable 10 made in accordance with the present invention. The particular configuration of cable 10 shown in the drawings is illustrative and, except as stated hereinafter, is not intended to limit the scope of the appended claims.

In accordance with the present invention, the improved multiconductor cable includes a plurality of conductors spaced apart in planar relationship. As embodied herein, cable 10 has a plurality of conductors 1 (five being shown in FIG. 5) positioned in parallel side-by-side planar relation. The specific conductors 1 depicted are multi-strand electrical signal carrying bare copper wire spaced apart 0.050"±0.002", but other conductor types, such as tin plated copper and various optical electromagnetic signal transmission fibers of glass or plastic, and other spacings may be used, and these are considered within the scope of the present invention.

Further in accordance with the present invention, and with particular reference to FIG. 4, the improved multiconductor cable includes a plurality of inner layers each substantially surrounding one of the conductors, with the inner layers being formed of porous, substantially unsintered polytetrafluoroethylene (PTFE). As embodied herein, cable 10 includes individual inner layers 2 cylindrically surrounding conductors 1. The porous, unsintered PTFE especially suitable for use in cable 10 is expanded extruded PTFE produced by the process described in U.S. Pat. No. 3,953,566.

Further in accordance with the present invention, the multiconductor cable includes a plurality of outer layers each substantially surrounding one of the inner layers and being formed of impermeable sintered PTFE. As embodied herein, cable 10 includes outer layers 3 of impermeable sintered PTFE almost completely surrounding inner layers 2 in the finished cable shown in FIGS. 4 and 5. The preferred PTFE material of layers 3 is extruded PTFE which has been heated to above the crystalline melt points of the PTFE resin and which has cooled to a voidless, full density condition.

Further in accordance with the present invention, the outer layers of the multiconductor cable are connected to one another by a plurality of webs each formed of impermeable sintered PTFE. As embodied herein, cable 10 includes webs 4 which, as shown in FIGS. 4 and 5, are composed in part of the same PTFE material as outer layers 3, namely full density, void-free PTFE, and in part by expanded PTFE which has been compressed to essentially full density conditions, in accordance with the process to be described hereinafter and which has been sintered to a void-free, impermeable state along with the unexpanded extruded PTFE.

The cable of the present invention is, to some degree, self-adjustable to insulation displacement connectors due to the fact that relatively soft inner insulation layer 2 allows dimensional accommodation of the conductors to the prongs 5 of an insulation displacement connector (IDC), as is depicted in FIG. 5. If this displacement connector is applied and the contact prongs 5 meet a conductor such as conductor 1a which is not 100% in the correct position, the conductor can glide into the conical zone of the contact prong at the same time pressing back the relatively soft respective inner insulation layer 2. During further introduction of the contact prongs into the cable the conductor glides into the IDC contact providing a very good mechanical and electrical contact with the conductor due to the elasticity of the contact prongs. The advantage of easy termination of IDC's in combination with excellent flexibility makes this cable advantageous in use, for example, with electronic equipment and business machines where a flexible interconnection of movable parts and a high number of flexes with a small bending radius is required.

The ribbon cable of the present invention is also about 30% lighter than the conventional one layer PTFE insulated cables, due to the expanded PTFE inner layer 2 which has more than 50% by volume of air. The weight factor is essential where lightweight cables are required, for example, in airframe applications. Due to the low dielectric constant ($E_r = 1.3$) of the porous expanded PTFE inner layer 3 (which part is subjected to the highest electrical field) the cables of the present invention provides additional electrical advantages such as high signal velocity and improved capacity and impedance values.

The inner insulation layer of porous expanded PTFE with more than 50 volume percent of air is also a good heat insulator. Thus, there can be tolerated relatively short applications of high temperatures at the outer PTFE layers 3 without harming or degrading relatively inexpensive conductor materials such as bare copper, or tinplated copper conductors which can be advantageously used instead of silverplated conductors which have to be used in conventional one layer PTFE ribbon cables. Also, the use of low temperature plastic or glass filaments or multi-strand tinplated conductors where the signal strands of a stranded conductor cannot be allowed to fuse together during high temperature periods is a definite price advantage for the user.

Further in accordance with the present invention, the method of fabricating the improved multiconductor cable includes the initial steps of embedding the conductors in separate top and bottom inner films of porous unsintered PTFE and top and bottom outer films of unsintered extruded PTFE, and compressing the inner and outer films located between the conductors to form the web regions. In this invention, the cable is fabricated using initially unsintered layers of PTFE; the inner insulation layers 2 are made out of unsintered, expanded PTFE and the outer insulation layers 3 are made of unsintered, extruded PTFE. As also embodied herein, this type of flexible, PTFE insulated ribbon cable can be produced in an advantageous manner in a one-step continuous process in that the conductors are embedded in two inner films of porous expanded, unsintered PTFE and two outer films of extruded, unsintered PTFE by combining those elements at room temperature in a roll nip under pressure to produce clarity or high translucency at the web with no compression over other regions of the cable. The change from opaque to a translucent and nearly clear material is an indication of a densification of the PTFE.

Figure 1:
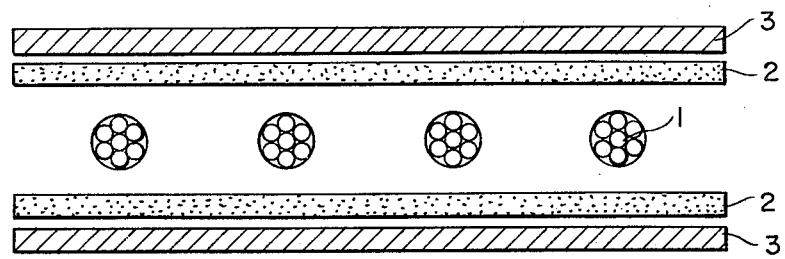
FIG. 1 is a diagrammatical view of the components of the preferred cable embodiment of the invention before assembly by the process of the present invention.

FIG. 1 is a diagrammatical view of the different PTFE films and the conductors before the compression process showing conductors 1 which, for example, can be bare copper, tinplated copper, optical fiber, etc., films 2 of porous expanded unsintered PTFE which have never been heated above crystalline melt points;

and films 3 of unsintered extruded PTFE which have never been heated above crystalline melt points.

Figure 2:
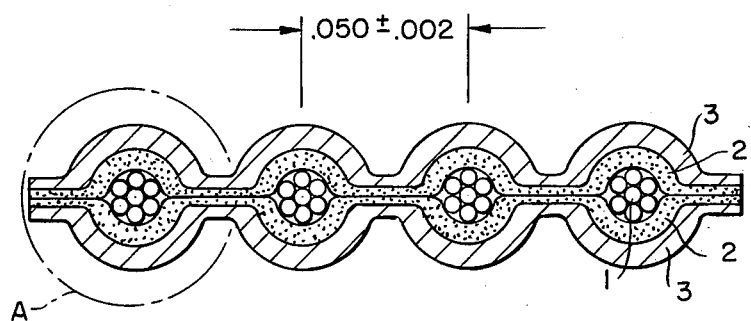
FIG. 2 is a view after the first two steps of the process used to assemble the cable using the components in FIG. 1.

In FIG. 2 is shown the flexible ribbon cable after compression in the regions of webs 4 but prior to sintering. The ribbon cable has conductors 1 spaced 0.050"±0.002" from each other. The conductors are, for example, bare copper or tinplated copper. Conductors 1 are surrounded by a layer of expanded soft PTFE 2 and a relatively hard layer of unsintered PTFE 3.

Figure 3:
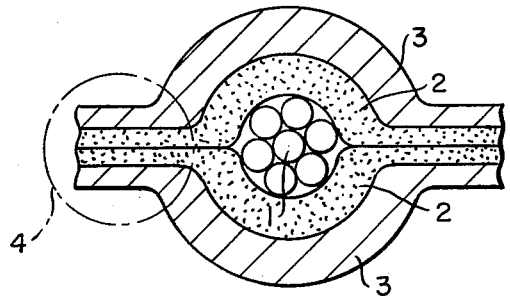
FIG. 3 is a magnified view of section "A" of the unfinished cable of FIG. 2.

In FIG. 3 the conductor 1 is clearly shown embedded in two inner films of porous expanded unsintered PTFE 2 and two outer films of porous extruded, unsintered PTFE 3. These elements are combined at room temperature, e.g., in a roll nip under pressure to clarity or high translucency at the web 4 with no compression over the other regions of the cable. The shadowing in layers 2 in the region of web 4 represents the relative densification which is more pronounced in inner layers 2 but also occurs to some extent in outer layers 3.

Further in accordance with the method of the present invention, the final step is sintering of the outer films and web regions. As embodied herein, the cable preform shown in FIGS. 2 and 3 is heated a short time to above the crystalline melt points of the PTFE. The present process thus advantageously uses the heat insulative capacity of the inner layers 2 to protect the conductors. The time for heating will depend upon the temperature and the particular configuration (i.e., cable dimensions and layer thicknesses) but one of ordinary skill in the art can determine the proper combination of time and temperature without undue experimentation.

During the sintering step, the compressed layers of expanded, unsintered film and the extruded unsintered PTFE in the web region, as well as the outer layers 3, of extruded unsintered films, coalesce to a high density impermeable layer. The sintering process may amorphously lock the expanded unsintered inner layer to some degree as the applied heat is above the crystalline melt points of PTFE, but the inner layers 2 are to remain substantially unsintered to achieve the purposes of the present invention.

Returning to FIG. 4, the new cable after heat treatment above the crystalline melt points of PTFE (sintering) shows the compressed layers of expanded unsintered PTFE film 2 and the extruded unsintered PTFE films 3 in the web region 4, as well as the outer layers of extruded unsintered PTFE films 3 coalesced to an impermeable layer. The sintering process may amorphously lock the expanded unsintered PTFE films 2 at least in the transitions zone between the two different PTFE films.

And finally, FIG. 5 shows the self-alignment ability of the conductors in the cables of the present invention in reaction to attachment of an insulation displacement connector. The relatively soft inner insulation 2 allows a dimensional accommodation of the conductors 1 to the prongs 5 of an insulation displacement connector.

It will be apparent to those skilled in the art that various modifications and variations could be made in the multiconductor cables and process for making same, of the invention without departing from the scope or spirit of the invention.

What is claimed is:

1. A multiconductor ribbon cable for transmitting electromagnetic signals comprising:
    a plurality of conductors spaced apart in a planar relationship;
    a plurality of inner layers each surrounding one of said conductors, said inner layers being formed of porous, substantially unsintered polytetrafluoroethylene;
    a plurality of outer layers each substantially surrounding one of said inner layers, said outer layer being formed of impermeable sintered polytetrafluoroethylene; and
    a plurality of webs each connecting an outer layer to an adjacent outer layer, each of said webs being formed of impermeable sintered polytetrafluoroethylene.

2. The cable as in claim 1 wherein the porous unsintered polytetrafluoroethylene layer is expanded unsintered polytetrafluoroethylene.

3. The cable as in claim 1 or 2 wherein the volume percent of air in the porous unsintered polytetrafluoroethylene layer is greater than about 50%.

4. The cable as in claim 1 wherein the conductors are metal.

5. The cable as in claim 1 wherein each of said conductors is a multi-strand conductor.

6. The cable as in claim 4 or 5 wherein the conductor material is unplated copper.

7. The cable as in claim 4 or 5 wherein the conductor material is tinplated copper.

8. The cable as in claim 4 or 5 wherein the conductors are light-conducting.

9. The cable as in claim 5 wherein the conductor material has a melting temperature below the sintering temperature of said porous polytetrafluoroethylene layer.

10. A method for manufacturing a multiconductor ribbon cable for transmitting electromagnetic signals, comprising the steps of:
    embedding a plurality of spaced apart conductors in top and bottom inner films of porous unsintered polytetrafluoroethylene and in top and bottom outer films of unsintered extruded polytetrafluoroethylene;
    compressing under pressure the inner and outer films located between the conductors to form flat web regions between adjacent conductors; and
    sintering the outer films and the entire web region.

11. The method as in claim 10 wherein the compressing step is carried out at room temperature.

12. The method as in claim 10 wherein the pressure of said compressing step is sufficient to transform the inner and outer films from an opaque condition to at least a translucent condition.

* * * * *